1

(12) United States Patent
Nishino et al.

(10) Patent No.: US 9,166,482 B2
(45) Date of Patent: Oct. 20, 2015

(54) POWER SUPPLY DEVICE FOR CONVERTING AC POWER FROM A COMMERCIAL POWER SUPPLY INTO DC POWER

(71) Applicant: Panasonic Corporation, Osaka (JP)

(72) Inventors: Hiroyuki Nishino, Osaka (JP); Hiroaki Koshin, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 327 days.

(21) Appl. No.: 13/826,132

(22) Filed: Mar. 14, 2013

(65) Prior Publication Data

US 2013/0194830 A1    Aug. 1, 2013

Related U.S. Application Data

(63) Continuation of application No. PCT/IB2011/002497, filed on Oct. 20, 2011.

(30) Foreign Application Priority Data

Oct. 25, 2010  (JP) ................................ 2010-238585

(51) Int. Cl.
   *G05F 1/00*      (2006.01)
   *H02M 3/335*    (2006.01)
   (Continued)

(52) U.S. Cl.
   CPC ............... *H02M 3/335* (2013.01); *H02M 1/08* (2013.01); *H02M 3/3382* (2013.01); *H02M 3/33592* (2013.01); *Y02B 70/1433* (2013.01); *Y02B 70/1475* (2013.01)

(58) Field of Classification Search
   USPC ........ 323/289, 290; 363/21.02, 21.03, 76–79, 363/85, 93
   See application file for complete search history.

(56) References Cited

U.S. PATENT DOCUMENTS 6,018,467 A    1/2000  Majid et al.
7,629,781 B2 * 12/2009  Kyono ........................... 323/267
(Continued)

FOREIGN PATENT DOCUMENTS

JP    H08-214559    8/1996
JP    H08-228484    9/1996
(Continued)

OTHER PUBLICATIONS

International Search Report for corresponding International Application No. PCT/IB2011/002497 mailed Jan. 17, 2012.
(Continued)

*Primary Examiner* — Adolf Berhane
*Assistant Examiner* — Gary Nash
(74) *Attorney, Agent, or Firm* — Renner, Otto, Boisselle & Sklar, LLP

(57) ABSTRACT

A power supply device includes a transformer; a series circuit of two bidirectional switching elements connected between terminals of the commercial power supply and having a rectification function and a switching function; an LC resonant circuit connected between a primary coil of the transformer and both ends of one of the bidirectional switching elements; a rectifying element connected to a secondary coil of the transformer; and a control circuit for inputting a gate driving signal to the bidirectional switching elements. The power supply device performs synchronous rectification from the bidirectional switching elements.

6 Claims, 10 Drawing Sheets

(51) Int. Cl.
*H02M 7/757* (2006.01)
*H02M 1/08* (2006.01)
*H02M 3/338* (2006.01)

(56) References Cited

U.S. PATENT DOCUMENTS

| | | | |
|---|---|---|---|
| 2001/0046143 A1* | 11/2001 | Bruckmann et al. | 363/56.05 |
| 2004/0208022 A1* | 10/2004 | Gibson | 363/16 |
| 2006/0103365 A1* | 5/2006 | Ben-Yaacov | 323/313 |
| 2007/0008747 A1* | 1/2007 | Soldano et al. | 363/21.04 |
| 2009/0051333 A1* | 2/2009 | Jo et al. | 323/235 |
| 2009/0244928 A1* | 10/2009 | Yang et al. | 363/16 |
| 2009/0323380 A1* | 12/2009 | Harrison | 363/126 |
| 2010/0135053 A1* | 6/2010 | Morimoto et al. | 363/127 |

FOREIGN PATENT DOCUMENTS

| | | |
|---|---|---|
| JP | 2007-28894 | 2/2007 |
| JP | 2009-148106 | 7/2009 |
| JP | 2010-187478 | 8/2010 |

OTHER PUBLICATIONS

Japanese Office Action dated Dec. 2, 2014 issued in corresponding Japanese application No. 2010-238585 and English summary thereof.

* cited by examiner

POWER SUPPLY DEVICE FOR CONVERTING AC POWER FROM A COMMERCIAL POWER SUPPLY INTO DC POWER

This application is a Continuation Application of PCT International Application No. PCT/IB2011/002497 filed on Oct. 20, 2011, which designated the United States.

FIELD OF THE INVENTION

The present invention relates to a power supply device (AC/DC converter) that converts AC power from a commercial power supply into DC power and outputs the DC power.

BACKGROUND OF THE INVENTION

A power supply device (AC/DC converter) using a multi-resonant half-bridge switching circuit is known as a power supply for a thin television receiver or the like (see Patent Document 1). The configuration of a conventional general AC/DC converter 50 is shown in FIG. 10. In the AC/DC converter 50, first, a rectifying circuit 53 such as a diode bridge rectifies AC power from a commercial power supply 52 and a capacitor 54 smoothes the rectified power. Next, a multi-resonant half-bridge DC/DC converter performs a voltage conversion. The DC/DC converter includes a multi-resonant half-bridge switching circuit composed of two switching elements Q51 and Q52 connected to a primary coil Np50 of a transformer 51, and rectifying diodes D53 and D54 respectively connected to the secondary coils Ns51 and Ns52 of the transformer 51. A resonant circuit composed of an inductor Lr and capacitors Cv and Ci is connected to the primary coil Np50 of the transformer 51.

As the switching elements Q51 and Q52, e.g., MOSFETs are used and the switching elements Q51 and Q52 are alternately turned on and off after a predetermined dead-off time. The commercial power supply 52 for the AC/DC converter 50 has a frequency of 50 Hz or 60 Hz. However, it is possible to increase a frequency of a current inputted to the primary coil Np50 of the transformer 51 by shortening a period in which the switching elements Q51 and Q52 are alternately turned on and off as compared with a period of the commercial power supply 52.

The transformer 51, the inductor Lr or the like can be miniaturized by increasing a switching frequency of the AC/DC converter 50. Meanwhile, switching loss increases as the switching frequency rises, but in the multi-resonant half-bridge switching circuit, the switching loss can be suppressed by zero voltage switching (ZVS) or zero current switching (ZCS). Thus, the multi-resonant half-bridge switching circuit may be a circuit suitable for high frequency.

As described above, since the switching loss is small in the multi-resonant half-bridge switching circuit, the multi-resonant half-bridge switching circuit is used for a small-sized, high-efficiency power supply. In a case where circuit efficiency is further required in the high-efficiency power supply, main loss is limited to the diodes and the transformer since the loss involved in switching conditions is small. In particular, the loss of the diodes becomes bigger in proportion to an increase in load capacity and thus it is important to reduce the number of diodes.

[Patent Document 1] Japanese Patent Application Publication No. Hei 8-214559.

SUMMARY OF THE INVENTION

In order to solve the problems in the conventional example, it is an object of the present invention to provide a power supply device for converting AC power from a commercial power supply into DC power and outputting the converted DC power, which can reduce loss caused by diodes, switching elements and the like constituting the power supply device.

In order to achieve the above object, a power supply device, for converting AC power from a commercial power supply into DC power and outputting the converted DC power, in accordance with an embodiment of the present invention is characterized to include: a transformer; a series circuit of two bidirectional switching elements connected between terminals of the commercial power supply and having a rectification function and a switching function; an LC resonant circuit connected between a primary coil of the transformer and both ends of one of the bidirectional switching elements; a rectifying element connected to a secondary coil of the transformer; and a control circuit for inputting gate driving signals to the bidirectional switching elements.

With respect to the configuration, each of the bidirectional switching elements may have two channels, in which body diodes are respectively connected in a forward direction and a reverse direction with respect to AC current from the commercial power supply, and two gate terminals respectively corresponding to the two channels, wherein the control circuit may perform synchronous rectification by inputting, during a half cycle of the AC current, a first gate driving signal having a pulse width substantially equal to the half cycle of the AC current to a gate terminal, corresponding to the channel in the forward direction, of each bidirectional switching element; input, at a predetermined period, a plurality of second gate driving signals having a predetermined pulse width to a gate terminal, corresponding to the channel in the reverse direction, of one of the bidirectional switching elements; and input, at a predetermined period, a plurality of additional second driving signals of which a phase is shifted by a half cycle compared to the second gate driving signals to a gate terminal, corresponding to the channel in the reverse direction, of the other bidirectional switching element, thereby switching the two bidirectional switching elements at a frequency higher than that of the commercial power supply.

Further, the bidirectional switching element may be a switching element having a lateral transistor structure using GaN/AlGaN.

Further, the control circuit may include independent first and second gate driving circuits respectively connected to the two gate terminals for one of the bidirectional switching elements, wherein primary and secondary coil sides of a transformer may be insulated from each other in each of the first and second gate driving circuits, wherein AND circuits may be respectively connected to the primary coils of the transformers in the first and second gate driving circuits, wherein during the half cycle of the AC current, the control circuit may input a first driving pulse signal for generating the first gate driving signal to one input terminal of the AND circuit in the first gate driving circuit; input a second driving pulse signal for generating the second gate driving signals or an another second driving pulse signal for generating the additional second gate driving signals to one input terminal of the AND circuit in the second gate driving circuit; input a carrier wave having a frequency sufficiently higher than frequencies of the first and second driving pulse signals and the another second driving pulse signal to the other input terminals of the two AND circuits; perform, using the AND circuit, a logical AND operation between the carrier wave and the first driving pulse signal and between the carrier wave and the second driving pulse signal or the another second driving pulse signal, so that the primary coils of the transformers are excited at the frequency of the carrier wave; and remove a frequency component of the carrier wave from the outputs induced to the secondary coils of the transformers through low-pass filters, thereby obtaining the first gate driving signal and the second gate driving signals or the additional second gate driving signals.

Further, the control circuit may include first and second gate driving circuits respectively connected to the two gate terminals for one of the bidirectional switching elements, wherein primary and secondary coil sides of a transformer having two secondary coils may be insulated from each other in the first and second gate driving circuits, wherein an AND circuit may be connected to the primary coil of the transformer, and photo couplers which are turned on or off depending on the polarity of the voltage of the commercial power supply may be respectively connected to the two secondary coil sides of the transformer such that a channel in which the body diode is connected in the forward direction is on, and wherein during the half cycle of the AC current, the control circuit may obtain the first gate driving signal from the outputs of the photo couplers; input a second driving pulse signal for generating the second gate driving signals or an another second driving pulse signal for generating the additional second gate driving signals to one input terminal of the AND circuit; input a carrier wave having a frequency sufficiently higher than frequencies of the second driving pulse signal and the another second driving pulse signal to the other input terminal of the AND circuit; perform, using the AND circuit, a logical AND operation between the carrier wave and the second driving pulse signal or the another second driving pulse signal, so that the primary coil of the transformer is excited at the frequency of the carrier wave; and remove a frequency component of the carrier wave from the outputs induced to the secondary coils of the transformer through low-pass filters, thereby obtaining the second gate driving signals or the additional second gate driving signals.

According to the present invention, AC power from a commercial power supply is directly synchronously rectified using bidirectional switching elements without passing through a rectifying circuit. That is, as compared with the prior art, diodes constituting a rectifying circuit are unnecessary, and thus, loss caused by diodes does not occur. Further, loss of synchronous rectification caused by the bidirectional switching elements, is very small as compared with that caused by a body diode of a MOSFET and the like, and consequently, it is possible to implement a power supply device with a small loss.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

Figure 1:
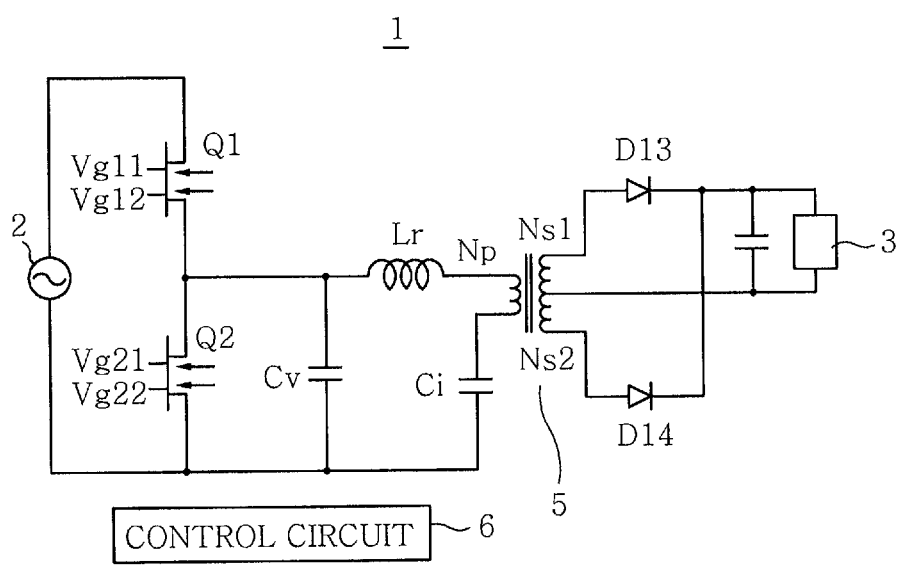
FIG. 1 is a view illustrating the configuration of a power supply device (AC/DC converter) in accordance with an embodiment of the present invention.

Hereinafter, embodiments of the present invention will be described in detail with reference to the accompanying drawings which form a part hereof. Throughout the drawings, like reference numerals are used to designate like or similar parts and redundant descriptions thereof will be omitted.

A power supply device will be described in accordance with an embodiment of the present invention. FIG. 1 illustrates a configuration of the power supply device (AC/DC converter) 1 in accordance with the embodiment.

As shown in FIG. 1, in the AC/DC converter 1, a multi-resonant half-bridge switching circuit including two bidirectional switching elements Q1 and Q2 is connected to a primary coil Np of a transformer 5. A commercial power supply (AC power supply) 2 is connected to the switching circuit. Connected to secondary coils Ns1 and Ns2 of the transformer 5 are rectifying elements D13 and D14 such as diodes, respectively. A resonant circuit composed of an inductor Lr and capacitors Cv and Ci is connected to the primary coil Np of the transformer 5.

Figure 10:
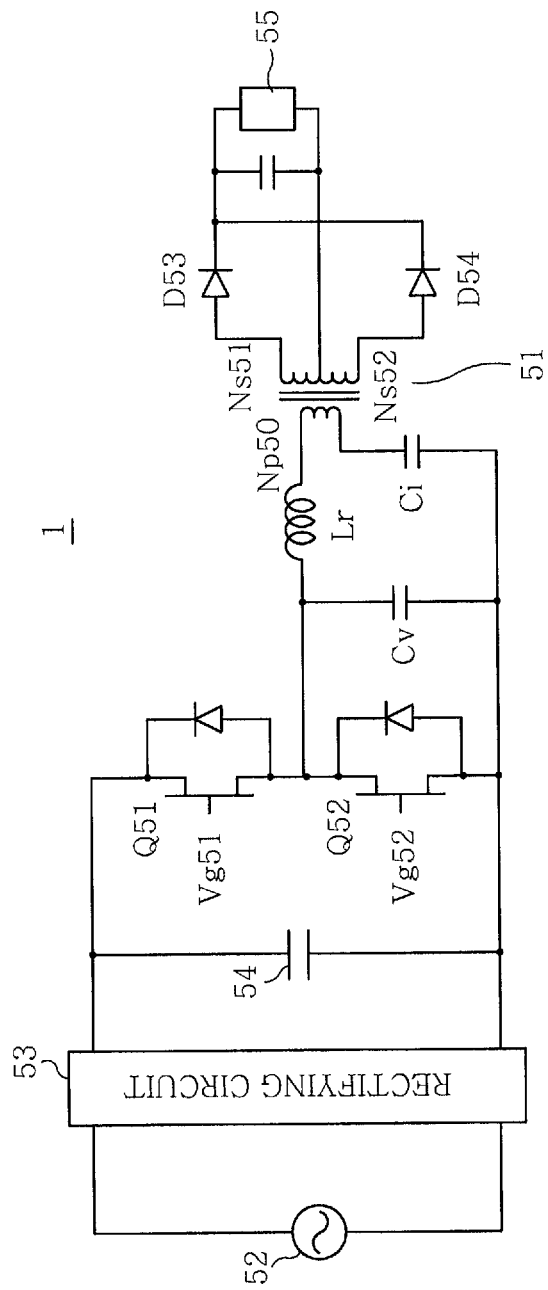
FIG. 10 is a view illustrating the basic configuration of a conventional AC/DC converter.

The bidirectional switching elements Q1 and Q2 serve as the rectifying circuit 53 and the switching elements Q51 and Q52 of the conventional example shown in FIG. 10, and implement a synchronous rectification function and a switching function. For this reason, a dual gate type switching element having two gate terminals is used as each of the bidirectional switching elements Q1 and Q2. A control circuit 6 inputs a predetermined gate driving signal to the two gate terminals of each of the bidirectional switching elements Q1 and Q2 (i.e., a total of four gate terminals). For convenience of drawing the figure, the wire connections between the control circuit 6 and the gate terminals of the bidirectional switching elements Q1 and Q2 are omitted.

Figure 3:
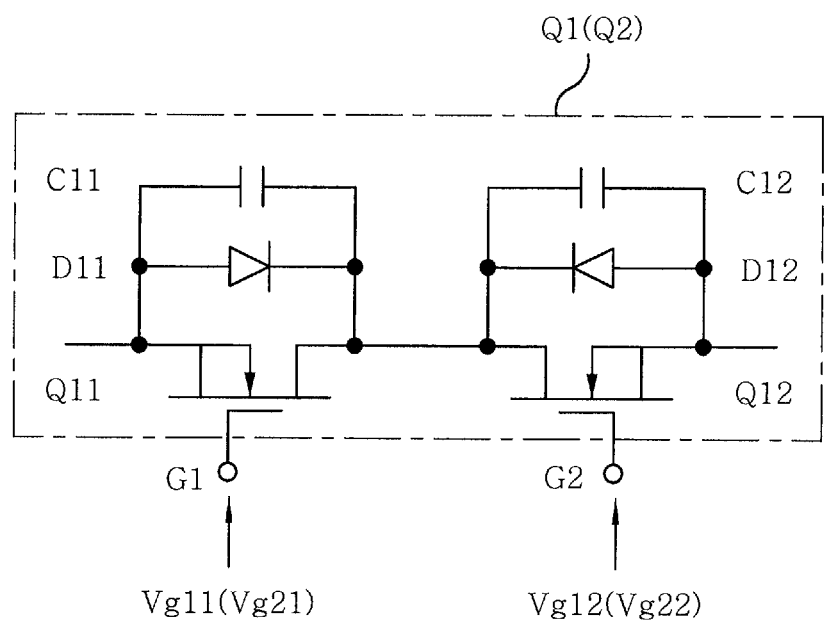
FIG. 3 is a view illustrating an equivalent circuit of the bidirectional switching elements.

An equivalent circuit of each of the bidirectional switching elements Q1 and Q2 is shown in FIG. 3. On the equivalent circuit of the bidirectional switching element Q1 (and Q2), two MOSFETs Q11 and Q12 are connected to each other such that the directions of body diodes D11 and D12 are opposite to each other. The body diodes D11 and D12 partially exist, but no parasitic diode exists in the entire switching element. In addition, C11 and C12 indicate parasitic capacitances.

Figure 5:
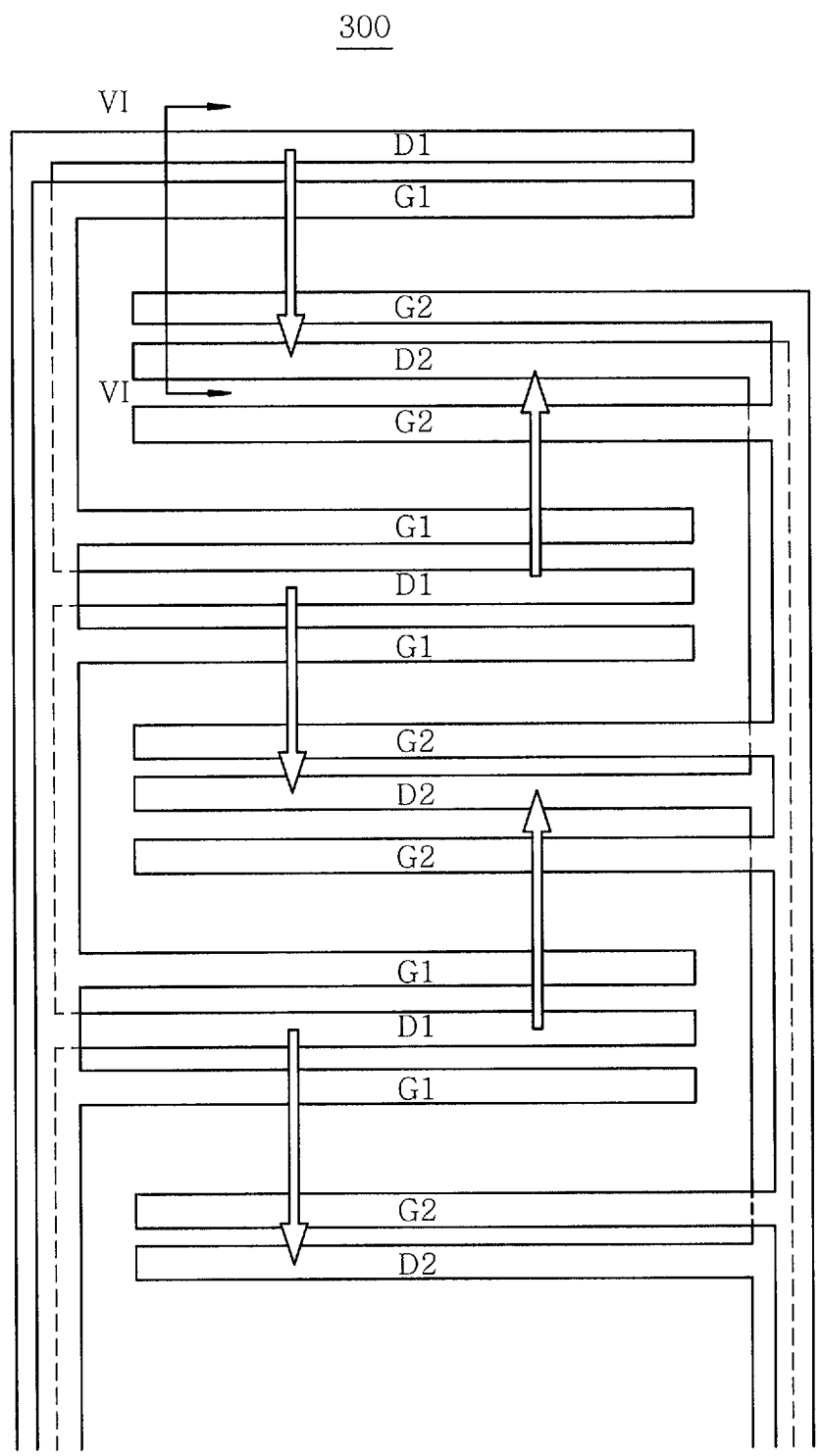
FIG. 5 is a plan view illustrating the configuration of bidirectional switching elements (dual gate)
Figure 6:
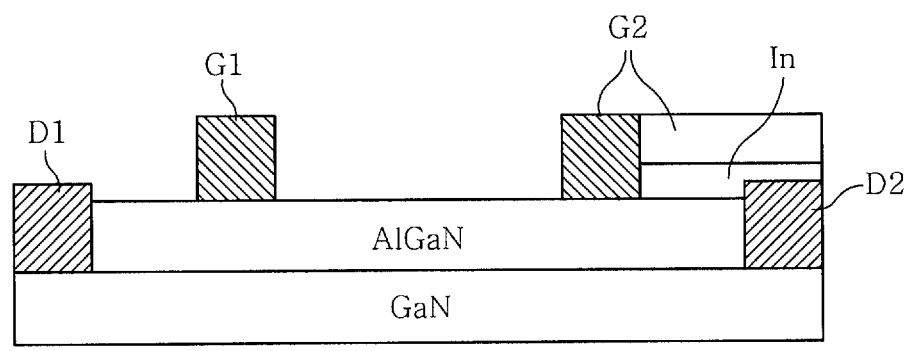
FIG. 6 is a sectional view taken along line VI-VI in FIG. 5.

Next, a specific example of the bidirectional switching element Q1 (and Q2) will be described. FIGS. 5 and 6 illustrate a configuration of a bidirectional switching element 300 having a lateral transistor structure using GaN/AlGaN. FIG. 5 is a plan view showing the configuration of the bidirectional switching element 300, and FIG. 6 is a sectional view taken along line VI-VI in FIG. 5. The bidirectional switching element 300 is provided with two gate electrodes G1 and G2 between two drain electrodes D1 and D2, and therefore, is referred to as a dual gate type switching element.

As shown in FIGS. 5 and 6, the bidirectional switching element 300 having the lateral dual gate transistor structure implements low loss structure by having just one portion where internal pressure is maintained. That is, each of the drain electrodes D1 and D2 is formed to reach a GaN layer, and each of the gate electrodes G1 and G2 is formed on an AlGaN layer. In a state where voltage is not applied to the gate electrodes G1 and G2, a blank zone of electron is formed in a two-dimensional electron gas layer generated on an AlGaN/GaN heterogeneous interface immediately below the gate electrodes G1 and G2, and current does not flow. On the other hand, if voltage is applied to the gate electrodes G1 and G2, current flows toward the drain electrode D2 from the drain electrode D1 (or vice versa) on the AlGaN/GaN heterogeneous interface.

A withstand voltage is required between the gate electrodes G1 and G2, and the gate electrodes G1 and G2 are necessarily spaced apart from each other at a certain distance, whereas the withstand voltage is not required between the drain electrode D1 and the gate electrode G1 and between the drain electrode D2 and the gate electrode G2. For this reason, the drain and gate electrodes D1 and G1, and the drain and gate electrodes D2 and G2 may overlap each other with an insulation layer In interposed therebetween. The element configured as described above needs to be controlled based on the voltages of the drain electrodes D1 and D2, and driving signals need to be inputted to the respective gate electrodes G1 and G2 (hence, it is referred to as a dual gate transistor structure).

Figure 4:
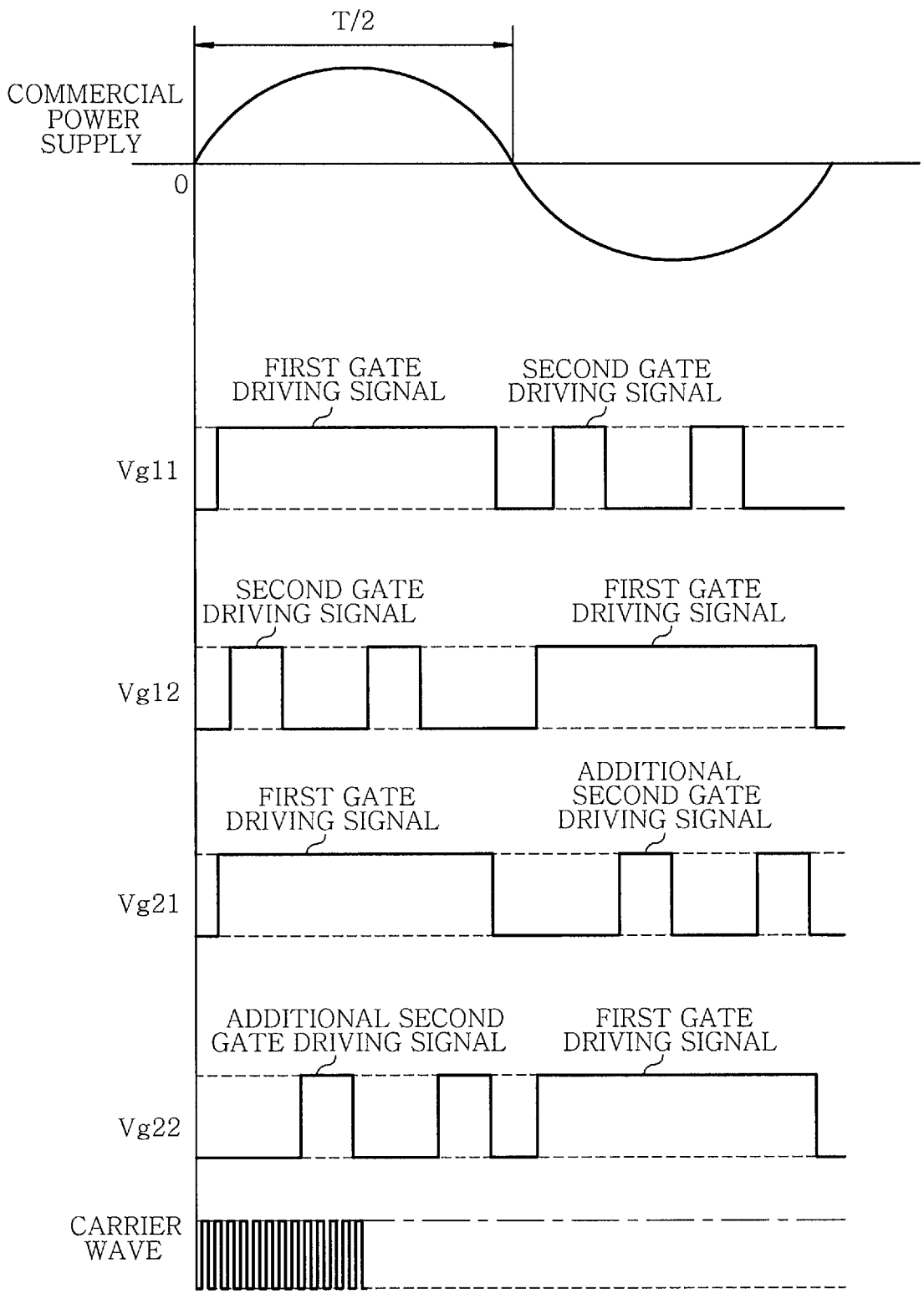
FIG. 4 is a view illustrating waveforms of driving signals inputted to each bidirectional switching element in the AC/DC converter.

As shown in FIG. 4, driving signals Vg11, Vg12, Vg21 and Vg22 are inputted to the respective gate terminals of the bidirectional switching elements Q1 and Q2. The commercial power supply 2 that is a power supply of the AC/DC converter 1 has a frequency of 50 Hz or 60 Hz, and the polarity of an input voltage is reversed. Meanwhile, the bidirectional switching elements Q1 and Q2 are configured such that the directions of the body diodes are opposite to each other. For this reason, the operation of the body diodes allows current to flow even when a gate driving signal is not inputted to the gate terminals (first gate terminals) corresponding to a channel in which the body diode is connected in a forward direction with AC current from the commercial power supply 2. However, the loss caused by the body diodes of the bidirectional switching elements Q1 and Q2 is hardly different from that caused by the conventional diodes.

In this embodiment, synchronous rectification is implemented by inputting, to the first gate terminals, the first gate driving signals Vg11 and Vg21 having a pulse width substantially equal to a half cycle (T/2) of the AC current during the half cycle of the AC current in the channel in which the body diode is connected in the forward direction with the AC current, as shown in FIG. 4. Accordingly, as compared with the conventional example shown in FIG. 10, the rectifying circuit 53 such as a diode bridge is omitted, so that the loss caused by the diodes does not occur. Also, since the synchronous rectification by the bidirectional switching elements Q1 and Q2 has on-state resistance much less than that of the body diodes D11 and D12 of the bidirectional switching elements Q1 and Q2, the loss caused by the synchronous rectification is very small. As a result, the loss caused by the elements included in the power supply device can be remarkably reduced as compared with that of the conventional configuration.

Also, a plurality of second gate driving signals Vg12 having a predetermined pulse width are inputted at a predetermined period to a second gate terminal of the one bidirectional switching element Q1 corresponding to a channel in which the body diode is connected in a reverse direction against the AC current. A plurality of additional second gate driving signals Vg22 of which the phase is shifted by a half cycle compared to the second gate driving signals Vg12 are inputted at a predetermined period to a second gate terminal of the other bidirectional switching element Q2 corresponding to the channel in which the body diode is connected in a reverse direction against the AC current. With respect to the second gate terminals corresponding to the channel in which the body diode is connected in the reverse direction against the AC current, the bidirectional switching elements Q1 and Q2 are alternately switched plural times during the half cycle of the AC current, so that the switching frequency is higher than the frequency of the commercial power supply 2. Accordingly, AC current with a frequency higher than that of the commercial power supply 2 flows into the primary coil Np of the transformer 5, whereby a high frequency is realized.

Here, in the second half cycle of the AC current, since the direction of the AC current from the commercial power supply 2 is reversed, the forward and reverse directions of the body diodes and the first and second gate terminals corresponding thereto are switched. For this reason, in the driving signals Vg11, Vg12, Vg21 and Vg22, the relationship between the first gate driving signal Vg11 and the second gate driving signals Vg12 is switched and the relationship between the first gate driving signal Vg21 and the additional second gate driving signals Vg22 is also switched. Although it has been described that the driving signals Vg11, Vg12, Vg21 and Vg22 are outputted from the control circuit 6, all the driving signals Vg11, Vg12, Vg21 and Vg22 are not limited to being outputted from the control circuit 6, as described below. Further, in a case where both coil sides of a transformer are insulated from each other in a gate driving circuit, a pulse signal having a predetermined frequency is inputted to the primary coil of the transformer such that the driving signals Vg11, Vg12, Vg21 and Vg22 after the rectification are generated at the secondary coil of the transformer.

Figure 2:
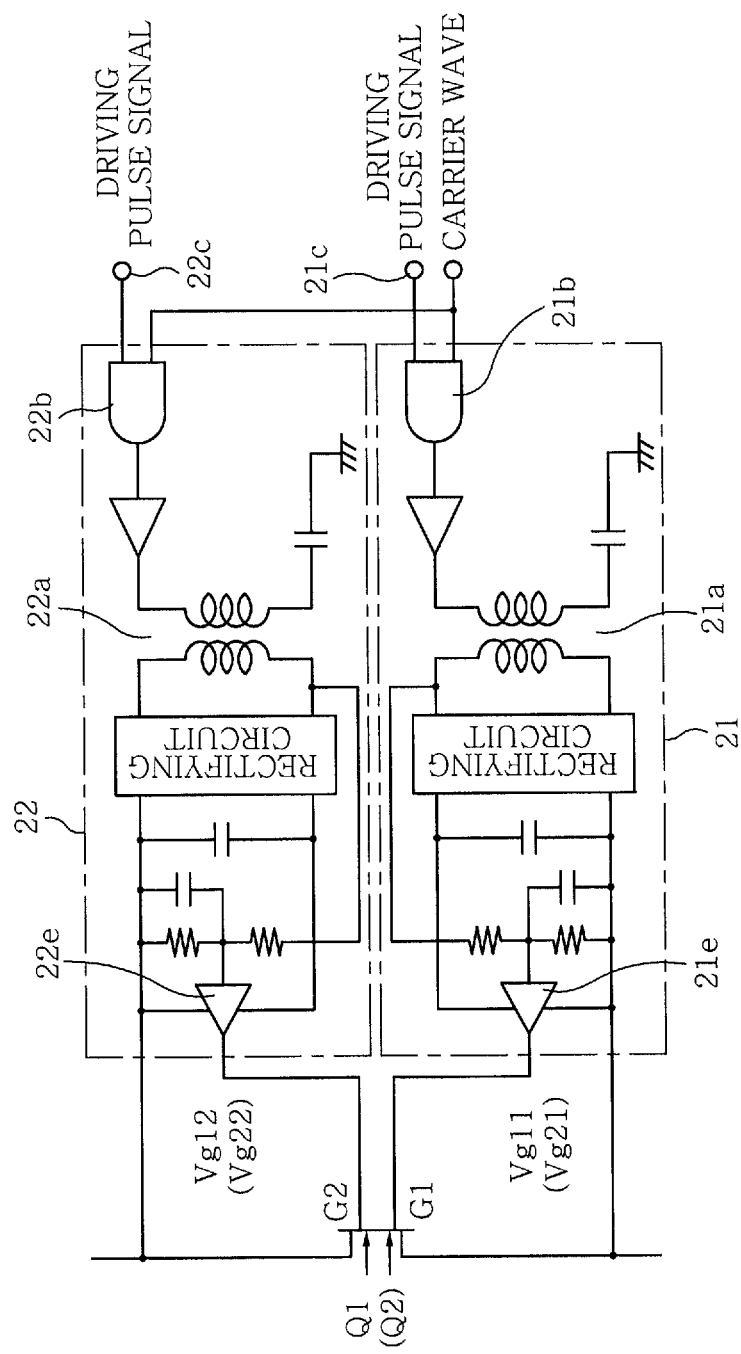
FIG. 2 is a view illustrating the configuration of a gate driving circuit for driving bidirectional switching elements in the AC/DC converter.

FIG. 2 illustrates the exemplary configuration of the gate driving circuit included in the control circuit 6, and the gate driving circuit inputs driving signals to two gate terminals G1 and G2 of the bidirectional switching element Q1 or Q2. In the exemplary configuration shown in FIG. 2, first and second gate driving circuits 21 and 22 having the same independent configuration are connected respectively to the gate terminals G1 and G2 of the bidirectional switching element Q1 or Q2. In the first and second gate driving circuits 21 and 22, primary and secondary coil sides of transformers 21a and 22a are electrically insulated from each other. In addition, AND circuits are connected to the primary coils of the transformers 21a and 22a.

During the half cycle of the AC current, the control circuit 6 inputs a first driving pulse signal for generating the first gate driving signal Vg11 or Vg21 to one input terminal of the AND circuit in the first gate driving circuit 21, and inputs a second driving pulse signal for generating the second gate driving signals Vg12 or another second driving pulse signal for generating the additional second gate driving signals Vg22 to one input terminal of the AND circuit in the second gate driving circuit 22. A carrier wave having a frequency sufficiently higher than frequencies of the first and second driving pulse signals and the another second driving pulse signal is inputted to the other input terminals of both the AND circuits. Next, the AND circuits perform a logical AND operation between the carrier wave and the first driving pulse signal and between the carrier wave and the second driving pulse signal or the another second driving pulse signal. Thereafter, the first and second gate driving circuits 21 and 22 obtain gate driving power by rectifying and smoothing inductive voltage generated from the secondary coils of the transformers 21a and 22a and simultaneously generate the driving signals Vg11 and Vg12 or the driving signals Vg21 and Vg22 from the corresponding inductive voltage. For this reason, the control circuit 6 needs to input a pulse signal having a predetermined frequency to the primary coils through terminals 21c and 22c for only a predetermined time. In the following description, the pulse signals for generating the gate driving signals Vg11, Vg12, Vg21 and Vg22 are referred to as driving pulse signals, in order to distinguish the pulse signals from the gate driving signals Vg11, Vg12, Vg21 and Vg22. In addition, the waveforms themselves of the gate driving signal and the driving pulse signal are identical or correlated to each other.

As already described with reference to FIG. 4, gate power is necessarily supplied to the gate driving circuits during a relatively long period throughout the half cycle of the commercial power supply. In a case where the bidirectional switching element of the present invention is a current-driven type element which maintains its on-state by supplying gate current, the size of the transformer increases in order to secure driving power through the transformer. In the configuration of FIG. 2, when the primary coils of the transformers 21a and 22a are excited by the driving pulse signals, a carrier wave having a frequency sufficiently higher (e.g., 1.5 MHz) than frequencies of the driving pulse signals is used, and the AND circuits 21b and 22b perform a logical AND operation between the carrier wave and the driving pulse signals. Therefore, the primary coils of the transformers 21a and 22a are excited at the frequency of the carrier wave. Respective outputs induced to the secondary coils of the transformer 21a and 22a are rectified and smoothed through the rectifying circuits and then supplied as control power supply to respective gate driving buffer ICs (integrated circuits) 21e and 22e. Simultaneously, the outputs induced to the secondary coils of the transformer 21a and 22a are inputted to the buffer ICs 21e and 22e after the frequency component of the carrier wave is removed from the induced outputs through resistor-capacitor (RC) circuits that are low-pass filters. Through this process, the gate driving signals Vg11, Vg12, Vg21 and Vg22 are obtained.

Figure 7:
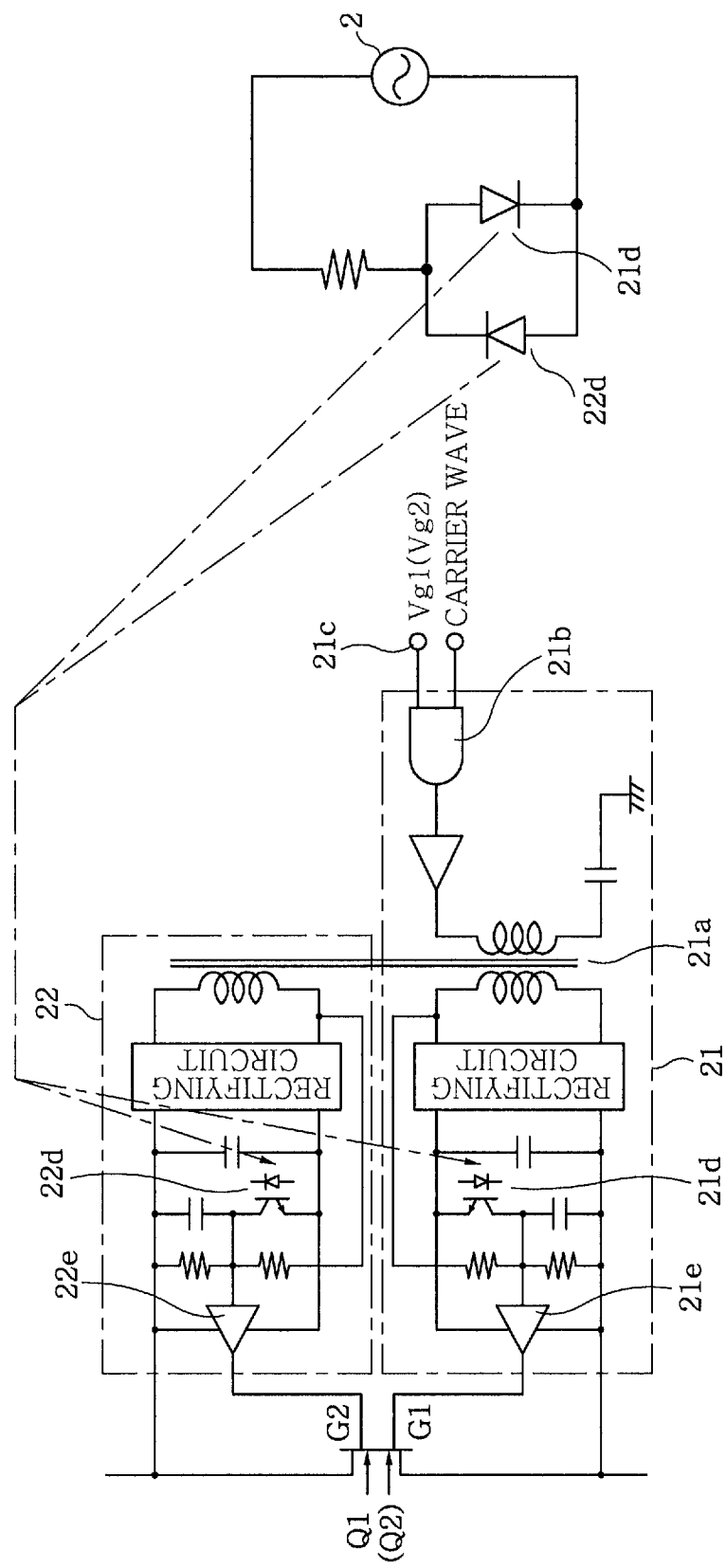
FIG. 7 is a view illustrating another exemplary configuration of the gate driving circuit in accordance with the embodiment.
Figure 8:
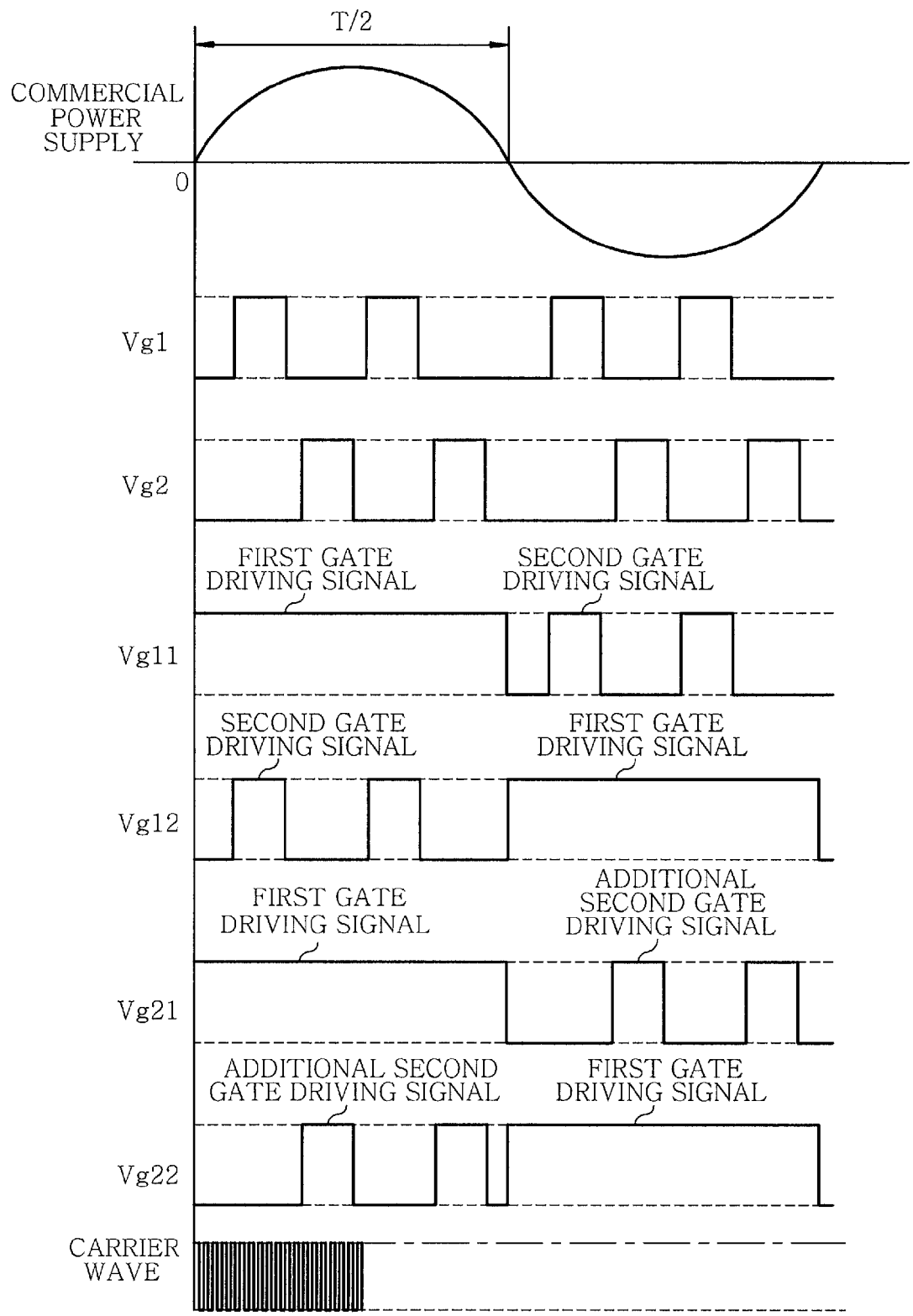
FIG. 8 is a view illustrating waveforms of driving signals inputted to each bidirectional switching element, driving pulse signals for generating the driving signals, and a carrier wave in the above exemplary configuration.

FIG. 7 illustrates another exemplary configuration of the gate driving circuit included in the control circuit 6. In addition, FIG. 8 illustrates waveforms of gate driving signals Vg11, Vg12, Vg21 and Vg22 and driving pulse signals Vg1 and Vg2 in this exemplary configuration. In the exemplary configuration shown in FIG. 7, the polarity of the voltage of the commercial power supply 2 is detected using photo couplers 21d and 22d, and a gate driving signal is always inputted to either the gate terminal G1 or G2, in addition to the exemplary configuration shown in FIG. 2. The AND circuit 21b is connected to a primary coil of the transformer 21a, and the photo couplers 21d and 22d, which are turned on or off depending on the polarity of the voltage of the commercial power supply 2, are respectively connected to two secondary coil sides of the transformer 21a such that a channel in which the body diode is connected in a forward direction is on. According to this configuration, one transformer having two secondary coils may be used for one switching element, instead of using the two transformers for one switching element in the exemplary configuration shown in FIG. 2. Further, in order to individually drive the two gates, two driving pulse signals having different timings are required in the exemplary configuration shown in FIG. 2, whereas only one driving pulse signal is used in this configuration. Thus, the control circuit can be simplified.

It is sufficient that the two driving pulse signals Vg1 and Vg2 respectively corresponding to the two switching elements Q1 and Q2 are used as driving pulse signals generated in the control circuit as shown in FIG. 8. If Vg1 is assumed as a driving pulse signal, Vg2 corresponds to an another driving pulse signal. These driving pulse signals Vg1 and Vg2 are simple signals that are alternately turned on/off by adding a dead-off time for avoiding the overlapping of the driving pulse signals. As described in FIG. 2, the driving pulse signals Vg1 and Vg2 are modulated by the carrier wave to excite the primary coil of the transformer, and an inductive voltage is generated at each of the two secondary coils. The respective inductive voltages generated at the secondary coils are rectified and smoothed to be supplied, as the control power supply, to respective gate driving buffer ICs 21e and 22e. Simultaneously, the respective inductive voltages are demodulated by low-pass filters and then inputted to the respective buffer ICs 21e and 22e. The output sides (transistor sides) of the photo couplers 21d and 22d for determining the polarity of the commercial power supply are connected between the positive (+) sides of the control power supplies and input terminals of the buffer ICs 21e and 22e. During the half cycle of the commercial power supply, one of the outputs from the buffer ICs 21e and 22e maintains a high-level state such that the channel in which the body diode is connected in the forward direction is on.

During the half cycle of the AC current, the control circuit 6 obtains the first gate driving signals Vg11 and Vg21 from the outputs of the photo couplers 21d and 22d. The control circuit 6 inputs the second driving pulse signal Vg1 for generating the second gate driving signals Vg12 or inputs the another second driving pulse signal Vg2 for generating the additional second gate driving signals Vg22 to one input terminal of the AND circuit. Further, the control circuit 6 inputs the carrier wave having the frequency sufficiently higher than frequencies of the driving pulse signals to the other input terminal of the AND circuit. In the meantime, since the driving power is continuously supplied by the carrier wave passing through the transformer, the control power supply is not lowered during the half cycle of the commercial power supply.

Figure 9:
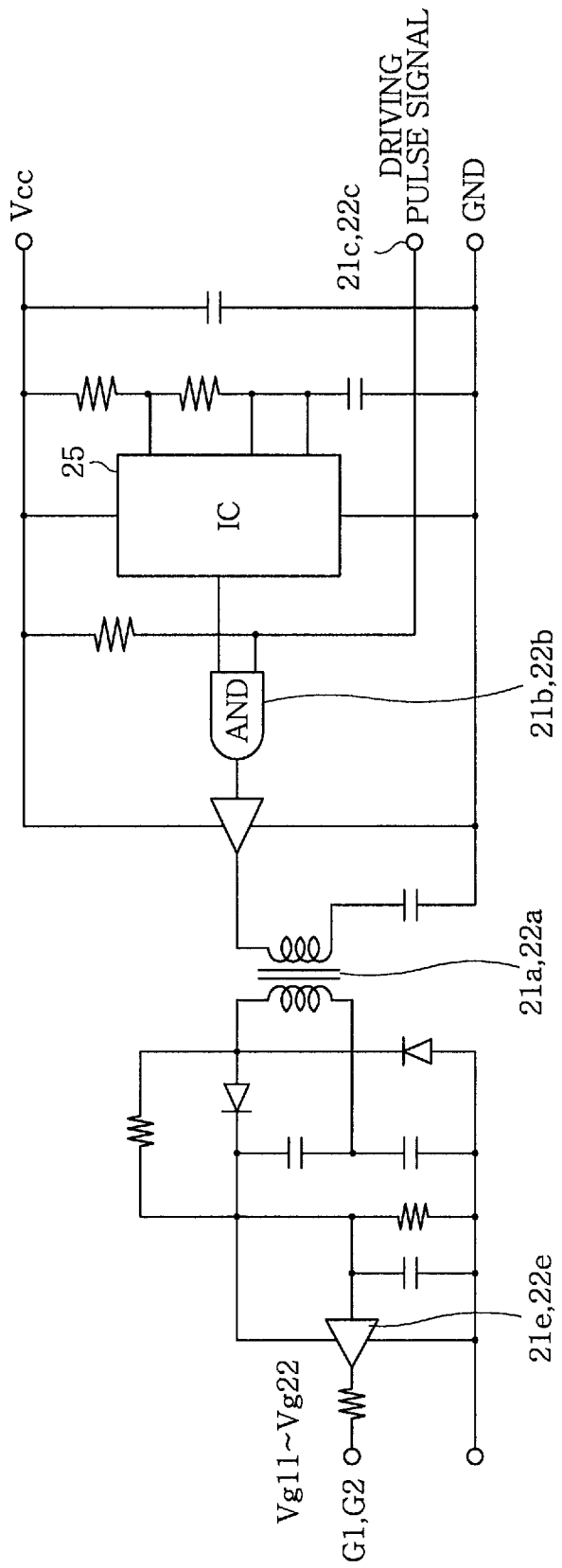
FIG. 9 is a view illustrating still another exemplary configuration of the gate driving circuit in accordance with the embodiment.

FIG. 9 illustrates still another exemplary configuration of the gate driving circuit, in which a non-stable multi-vibrator is used as a means for generating a carrier wave. IC 25 is a timer IC, e.g., LMC555 (manufactured by National Semiconductor Corporation) or the like. The output (carrier wave) of the IC 25 is AND-operated, by the AND circuits 21b and 22b, with driving pulse signals inputted from the terminals 21c and 22c, and excites the primary coils of the transformers 21a and 22a through a driver IC. The output voltages induced to the secondary coils of the transformers 21a and 22a are doubly rectified and smoothed using two diodes and two capacitors, and the control power supply of gate driving buffer ICs 21e and 22e is generated. A signal, which is generated by removing the frequency component of the carrier wave from the outputs of the secondary coils by using a low-pass filter composed of a resistor and a capacitor, is inputted to the input terminal of the buffer ICs 21e and 22e. In this exemplary configuration, the double voltage rectification is used to be applicable to even a switching element having a high gate voltage. However, it will be apparent that ordinary full-wave rectification may be used.

As described above, according to the configuration of the present invention, since synchronous rectification is performed using a bidirectional switching element, a rectifying circuit such as a diode bridge is unnecessary, and loss caused by diodes does not occur. In addition, since the loss of synchronous rectification caused by the bidirectional switching element is much smaller than that caused by a body diode of a MOSFET or the like, it is possible, as a result, to implement a low-loss power supply device. Further, during the half cycle of AC current, two switching elements are alternately turned on/off plural times, so that the switching frequency is higher than the frequency of the commercial power supply. Furthermore, when a driving pulse signal is transferred to a transformer, a carrier wave having a frequency sufficiently higher than frequencies of the driving pulse signals is used, thereby allowing the transformer to be miniaturized. Even when gate power is supplied during the half cycle of the commercial power supply, the control power can be surely obtained. For this reason, when the multi-resonant half-bridge switching circuit is configured to have the bidirectional switching element, precise control is possible. Further, an input rectifying means can be omitted from a commercial power supply, thereby further improving high efficiency.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A power supply device for converting AC power from a commercial power supply into DC power and outputting the converted DC power, the power supply device comprising:
   a transformer;
   a series circuit of two bidirectional switching elements connected between terminals of the commercial power supply and having a rectification function and a switching function;
   an LC resonant circuit connected between a primary coil of the transformer and both ends of one of the bidirectional switching elements;
   a rectifying element connected to a secondary coil of the transformer; and
   a control circuit for inputting gate driving signals to the bidirectional switching elements,
   wherein each of the bidirectional switching elements has two channels, in which body diodes are respectively connected in a forward direction and a reverse direction with respect to AC current from the commercial power supply, and two gate terminals respectively corresponding to the two channels, and
   wherein the control circuit performs synchronous rectification by inputting, during a half cycle of the AC current, a first gate driving signal having a pulse width substantially equal to the half cycle of the AC current to a gate terminal, corresponding to the channel in the forward direction, of each bidirectional switching element; inputs, at a predetermined period, a plurality of second gate driving signals having a predetermined pulse width to a gate terminal, corresponding to the channel in the reverse direction, of one of the bidirectional switching elements; and inputs, at a predetermined period, a plurality of additional second driving signals of which a phase is shifted by a half cycle compared to the second gate driving signals to a gate terminal, corresponding to the channel in the reverse direction, of the other bidirectional switching element, thereby switching the two bidirectional switching elements at a frequency higher than that of the commercial power supply.

2. The power supply device of claim 1, wherein the bidirectional switching element is a switching element having a lateral transistor structure using GaN/AlGaN.

3. The power supply device of claim 2, wherein the control circuit includes independent first and second gate driving circuits respectively connected to the two gate terminals for one of the bidirectional switching elements,
   wherein primary and secondary coil sides of a transformer are insulated from each other in each of the first and second gate driving circuits,
   wherein AND circuits are respectively connected to the primary coils of the transformers in the first and second gate driving circuits,
   wherein during the half cycle of the AC current, the control circuit inputs a first driving pulse signal for generating the first gate driving signal to one input terminal of the AND circuit in the first gate driving circuit; inputs a second driving pulse signal for generating the second gate driving signals or an another second driving pulse signal for generating the additional second gate driving signals to one input terminal of the AND circuit in the second gate driving circuit; inputs a carrier wave having a frequency sufficiently higher than frequencies of the first and second driving pulse signals and the another second driving pulse signal to the other input terminals of the two AND circuits; performs, using the AND circuit, a logical AND operation between the carrier wave and the first driving pulse signal and between the carrier wave and the second driving pulse signal or the another second driving pulse signal, so that the primary coils of the transformers are excited at the frequency of the carrier wave; and removes a frequency component of the carrier wave from the outputs induced to the secondary coils of the transformers through low-pass filters, thereby obtaining the first gate driving signal and the second gate driving signals or the additional second gate driving signals.

4. The power supply device of claim 2, wherein the control circuit includes first and second gate driving circuits respectively connected to the two gate terminals for one of the bidirectional switching elements,
   wherein primary and secondary coil sides of a transformer having two secondary coils are insulated from each other in the first and second gate driving circuits,
   wherein an AND circuit is connected to the primary coil of the transformer, and photo couplers which are turned on or off depending on the polarity of the voltage of the commercial power supply are respectively connected to the two secondary coil sides of the transformer such that a channel in which the body diode is connected in the forward direction is on, and
   wherein during the half cycle of the AC current, the control circuit obtains the first gate driving signal from the outputs of the photo couplers; inputs a second driving pulse signal for generating the second gate driving signals or an another second driving pulse signal for generating the additional second gate driving signals to one input terminal of the AND circuit; inputs a carrier wave having a frequency sufficiently higher than frequencies of the second driving pulse signal and the another second driving pulse signal to the other input terminal of the AND circuit; performs, using the AND circuit, a logical AND operation between the carrier wave and the second driving pulse signal or the another second driving pulse signal, so that the primary coil of the transformer is excited at the frequency of the carrier wave; and removes a frequency component of the carrier wave from the outputs induced to the secondary coils of the transformer through low-pass filters, thereby obtaining the second gate driving signals or the additional second gate driving signals.

5. The power supply device of claim 1, wherein the control circuit includes independent first and second gate driving circuits respectively connected to the two gate terminals for one of the bidirectional switching elements,
- wherein primary and secondary coil sides of a transformer are insulated from each other in each of the first and second gate driving circuits,
- wherein AND circuits are respectively connected to the primary coils of the transformers in the first and second gate driving circuits,
- wherein during the half cycle of the AC current, the control circuit inputs a first driving pulse signal for generating the first gate driving signal to one input terminal of the AND circuit in the first gate driving circuit; inputs a second driving pulse signal for generating the second gate driving signals or an another second driving pulse signal for generating the additional second gate driving signals to one input terminal of the AND circuit in the second gate driving circuit; inputs a carrier wave having a frequency sufficiently higher than frequencies of the first and second driving pulse signals and the another second driving pulse signal to the other input terminals of the two AND circuits; performs, using the AND circuit, a logical AND operation between the carrier wave and the first driving pulse signal and between the carrier wave and the second driving pulse signal or the another second driving pulse signal, so that the primary coils of the transformers are excited at the frequency of the carrier wave; and removes a frequency component of the carrier wave from the outputs induced to the secondary coils of the transformers through low-pass filters, thereby obtaining the first gate driving signal and the second gate driving signals or the additional second gate driving signals.

6. The power supply device of claim 1, wherein the control circuit includes first and second gate driving circuits respectively connected to the two gate terminals for one of the bidirectional switching elements,
- wherein primary and secondary coil sides of a transformer having two secondary coils are insulated from each other in the first and second gate driving circuits,
- wherein an AND circuit is connected to the primary coil of the transformer, and photo couplers which are turned on or off depending on the polarity of the voltage of the commercial power supply are respectively connected to the two secondary coil sides of the transformer such that a channel in which the body diode is connected in the forward direction is on, and
- wherein during the half cycle of the AC current, the control circuit obtains the first gate driving signal from the outputs of the photo couplers; inputs a second driving pulse signal for generating the second gate driving signals or an another second driving pulse signal for generating the additional second gate driving signals to one input terminal of the AND circuit; inputs a carrier wave having a frequency sufficiently higher than frequencies of the second driving pulse signal and the another second driving pulse signal to the other input terminal of the AND circuit; performs, using the AND circuit, a logical AND operation between the carrier wave and the second driving pulse signal or the another second driving pulse signal, so that the primary coil of the transformer is excited at the frequency of the carrier wave; and removes a frequency component of the carrier wave from the outputs induced to the secondary coils of the transformer through low-pass filters, thereby obtaining the second gate driving signals or the additional second gate driving signals.

* * * * *